Feb. 17, 1970  D. J. HILL  3,495,865

SECTIONAL TRAILER

Filed Nov. 20, 1967

INVENTOR.
D. James Hill

United States Patent Office 3,495,865
Patented Feb. 17, 1970

3,495,865
SECTIONAL TRAILER
Delmar James Hill, P.O. Box 6873,
Grosse Pointe Woods, Mich. 48236
Filed Nov. 20, 1967, Ser. No. 684,434
Int. Cl. B60p 3/02
U.S. Cl. 296—22                                    10 Claims

ABSTRACT OF THE DISCLOSURE

A trailer which laterally divides into two sections each of which is individually self-supporting and mobile.

This invention relates to trailers, more particularly to catering, dispensing and display trailers.

An object of this invention is to provide a trailer capable of being towed in a conventional manner that can be quickly and easily separated into independently functional mobile increments.

Another object of this invention is to provide a trailer capable of being towed in a conventional manner that can be quickly and easily separated into mobile increments of a size allowing their movement through conventional passage doors into and out of buildings.

Another object of this invention is to provide a trailer that can be quickly and easily separated into mobile increments offering multiple functional configurations.

Another object of this invention is to provide mobile sales display increments of a size and design allowing their loading at a supply point, their movement through conventional passage doors, their combination into a mobile entity that can be conventionally towed to its destination, its separation into increments, and their movement through conventional passage doors to point of sale, thus eliminating all but the original loading labor from the moving of any product to that point of sale.

These and other objects will be readily evident upon a study of the following specifications and accompanying drawing, showing only one form which this invention might take, wherein.

Figure 1:
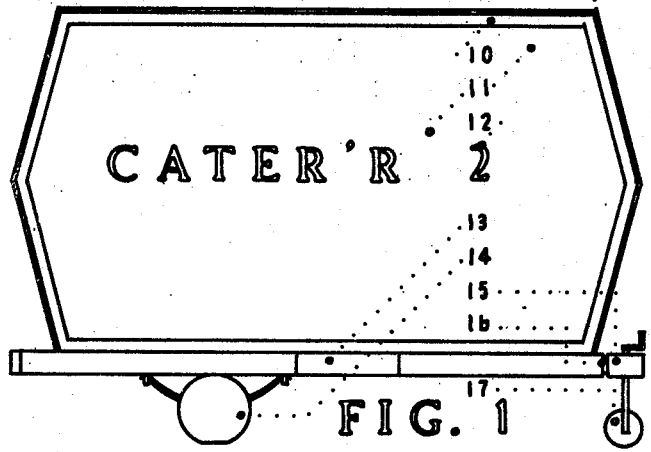
FIGURE 1 is a side elevation of the exterior of this invention.

Referring now to the drawing which shows two trailer sections in towing position in detail, FIGURE 1 shows the edge of the enclosing top 10 of a substantially typical trailer section which contains the means for lighting a side 11, an example of advertising logo 12, the supporting frame 13, running gear 14, hitch 15, telescoping tow bar 16 and dolly wheel 17.

Figure 2:
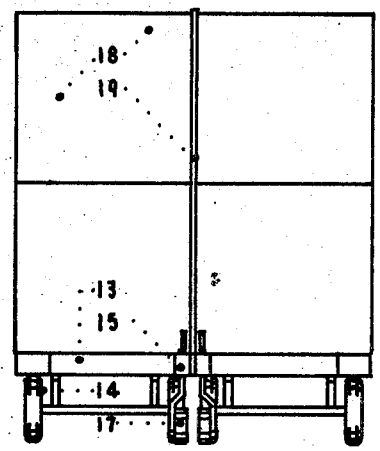
FIGURE 2 is a front elevation of the exterior of this invention.

FIGURE 2 shows another view of the frame 13, running gear 14, hitch 15, and dolly wheels, as well as enclosing end 18, and the sealing gasket 19 between the two sections.

Figure 3:
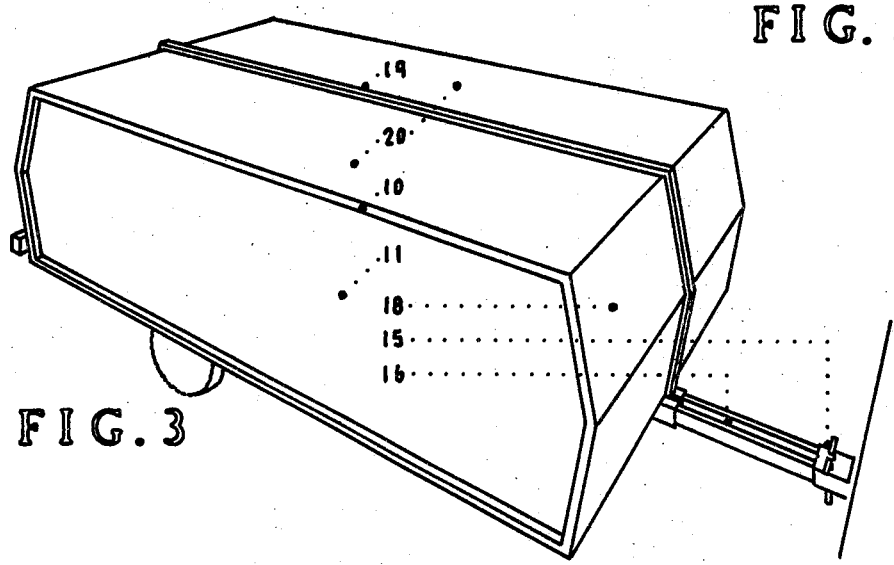
FIGURE 3 is a perspective view of this invention.

FIGURE 3 shows another view of the top edges 10, side 11, hitch 15, tow bars 16 extended, end 18, seal 19, and roof 20 of the two trailer sections joined about a vertical plane of separation.

Figure 4:
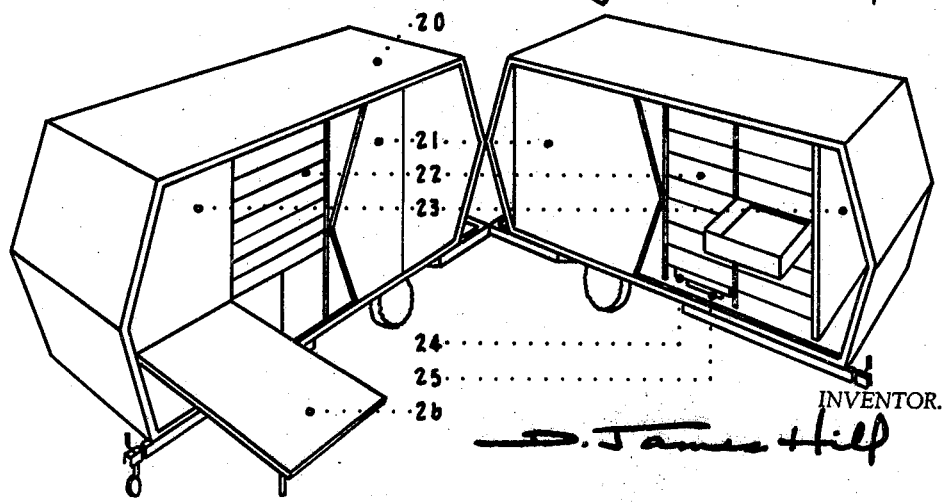
FIGURE 4 is a perspective view of this invention showing one possible open configuration and a suggested juxtaposition of various storage elements within.

FIGURE 4 shows, in an open view, the enclosing doors 21, drawer storage 22, shelf and other storage 23, water storage pan 24, water heating element 25, and serving table 26.

Obviously, necessary elements such as trailer running and brake lights, wiring, and license plate bracket are not shown, nor is the detail on the telescoping tow bars, lock for same, or the transit locks necessary to combine the sections into the trailer entity, as these are conventional in nature and have no bearing on the basic concept of this invention.

In use, this particular version of this invention would function as follows:

The heating element 24 is activated under the water storage pan 25, hot food is stored in the drawers 22, cold food and the means of keeping that food cold in the separately insulated storage sections 23, miscellaneous supplies are appropriately stored, and the enclosing doors 21 closed and secured, forming an insulated, pollutant-free, transportable entity.

The sections are then moved outside the building through any conventional passage door, joined and locked into a mobile entity capable of legal-speed highway travel, which entity is then towed as a conventional trailer to its sales destination. There, the sections are unlocked, separated, and moved into the building and/or into the desired configuration for dispensing the contained food.

While I have shown in the drawing and described in detail one preferred configuration of my invention, I do not limit myself to the exact details of construction and operation as herein set forth by way of illustration, as it is obvious that numerous changes and variations could be made therein by those skilled in the art without departing from the spirit and scope of my invention or exceeding the scope of the appended claims.

I claim:

1. A trailer structure, comprising:
   (a) an enclosure having walls defining an internal compartment and a pair of enclosure sections which are separable from one another along a vertical plane of separation to open said compartment;
   (b) wheel means connected below each of said enclosure sections for supporting each for motion which is independent of the other in a direction parallel to their plane of separation; and
   (c) a towing member having one end suited for connection to a towing vehicle, the other end of the towing member being connected to the enclosure to move both of said enclosure sections as a unit at such times as they are connected together about said plane of separation.

2. A trailer structure, comprising:
   (a) a pair of enclosure sections, each of the enclosure sections being disposed in a towing position in which it is adjacent the other enclosure section, and being separable from the other enclosure section by relative motion between them in a first direction;
   (b) wheel means connected below each of said enclosure sections such that each enclosure section is independently supported for forward motion in a direction at right angles to said first direction; and
   (c) a towing member suited for connection to a towing vehicle, said towing member being connected to the enclosure sections for moving them forward as a unit at such times as they are in said towining position.

3. In a trailer structure, the combination comprising:
   (a) a pair of trailers, each having a frame and wheel means for supporting its frame for forward motion, said trailers being disposed in a towing position in which the forward end of the frame of one trailer is proximate the forward end of the frame of the other trailer, and the side of one frame is adjacent the side of the other frame, said trailers being separable from one another and said towing position;
   (b) a hitching member suited for connection to a towing vehicle, and connected to said pair of trailers in a forward position substantially midway between their outer sides for moving them forward as a unit; and (c) a pair of enclosures, each having an internal compartment with an opening for access into the compartment, each enclosure being mounted on a respective trailer frame such that the opening of one of said enclosures is blocked by the other enclosure, and the opening of each enclosure is unblocked by the other enclosure as the two trailers are separated from one another.

4. In a trailer structure, the combination comprising:
(a) a pair of trailers, each having a frame and wheel means for supporting its frame for forward motion, said trailers being disposed in a towing position in which the forward end of the frame of one trailer is proximate the forward end of the frame of the other trailer, and the side of one frame is adjacent the side of the other frame, said trailers being separable from one another and said towing position;

(b) a hitching member suited for connection to a towing vehicle, and connected to said pair of trailers in a forward position substantially midway between their outer sides for moving them forward as a unit; and (c) a pair of similarly shaped enclosures, each being mounted on a respective trailer frame, and having an internal compartment and an opening for access into the compartment, each enclosure blocking the opening of the other enclosure, and formed to unblock the opening of the other enclosure as the two trailers are separated from one another.

5. The combination as defined in claim 4, including dolly wheel means for supporting at least one of the trailers in an upright position at such times as it is separated from the other trailer.

6. The combination as defined in claim 4, in which a towing member supports the hitching member, the towing member being connected to the forward ends of the two trailers such that it can be moved, with respect to the trailers, between an extended position in which the hitching member is spaced forwardly of the two trailers, and a retracted position in which the hitching member is adjacent the two trailers.

7. The combination as defined in claim 4, including a seal member supported between the pair of enclosures about said openings.

8. The combination as defined in claim 4, including means in at least one of said pair of enclosures suited for storing food.

9. The combination as defined in claim 4, in which the wheel means of at least one of said trailers is adapted to support it for wheeled motion when it is separated from the other trailer.

10. The combination as defined in claim 4, including a dolly connected to one of said trailers for supporting it in an upright position when it is separated from the other trailer.

References Cited

UNITED STATES PATENTS

| | | | |
|---|---|---|---|
| 3,233,935 | 2/1966 | Brindle | 296—23 |
| 3,157,427 | 11/1964 | Reynolds | 296—23 |
| 3,119,638 | 1/1964 | Sneed | 296—23 |
| 1,413,575 | 4/1922 | Cochran | 296—23 X |
| 3,162,459 | 12/1964 | Marmorine | 280—413 |

PHILIP GOODMAN, Primary Examiner

U.S. Cl. X.R.

296—23; 280—413

PO-1050
(5/69)

UNITED STATES PATENT OFFICE
CERTIFICATE OF CORRECTION

Patent No. 3,495,865    Dated February 17, 1970

Inventor(s)    D. J. HILL

It is certified that error appears in the above-identified patent and that said Letters Patent are hereby corrected as shown below:

Column 1, that portion of the name of the inventor reading "Delmar" should read --Delmer--.

Column 2, line 58, the word "towining" should read --towing--.

Signed and sealed this 11th day of August 1970.

(SEAL)
Attest:

EDWARD M. FLETCHER, JR.
Attesting Officer

WILLIAM E. SCHUYLER, JR.
Commissioner of Patents